United States Patent [19]

Valette et al.

[11] Patent Number: 5,078,514
[45] Date of Patent: Jan. 7, 1992

[54] SWITCH AND SYSTEM FOR SWITCHING INTEGRATED OPTICAL MULTICHANNELS AND SWITCH PRODUCTION METHOD

[75] Inventors: Serge Valette; Jean S. Danel, both of Grenoble, France

[73] Assignee: Commissariat a l'Energie Atomique, Paris, France

[21] Appl. No.: 669,452

[22] Filed: Mar. 14, 1991

[30] Foreign Application Priority Data

Mar. 27, 1990 [FR] France .............................. 90 03902

[51] Int. Cl.[5] .............................................. G02B 5/14
[52] U.S. Cl. ........................................ 385/20; 385/16
[58] Field of Search ........................... 350/96.11-96.14

[56] References Cited

U.S. PATENT DOCUMENTS

| | | | |
|---|---|---|---|
| 3,649,837 | 3/1972 | Lehovec | 350/162.16 |
| 3,665,218 | 5/1972 | Andrews | 357/15 |
| 4,456,337 | 6/1984 | Nicholson | 350/357 |
| 4,488,780 | 12/1984 | Nicholson | 350/320 |

FOREIGN PATENT DOCUMENTS 62-141507 6/1987 Japan .
8807697 10/1988 PCT Int'l Appl. .

OTHER PUBLICATIONS

Bogert et al., "Low Crosstalk 4×4 TiLiNbO$_3$ Optical Switch with Permanently attached Polarization Maintaining Fiber Array", Journal of Lightwave Technology, vol. LT-4, No. 10, Oct. 1986, pp. 1542-1545.
"Strictly Nonblocking 8×8 Integrated Optical Switch Matrix", Electronic Letters, 17th Jul. 1986, vol. 22, No. 15, pp. 816-818.

Primary Examiner—Akm Ullah
Attorney, Agent, or Firm—Oblon, Spivak, McClelland, Maier & Neustadt

[57] ABSTRACT

Switch and system for the switching of integrated optical multichannels and switch production method. The switch comprises a substrate (2) supporting a buffer film (12), a recess (24) made in the buffer film and the substrate, one input microguide (18) and two adjacent output microguides (20, 22), the input and output microguides being disposed on both sides of the recess and orientated approximately along a first direction, a flexible girder (26) defined in the buffer film and equipped with a central microguide (32) over its entire length orientated along the first direction, this girder comprising one free extremity able to deform in the recess along a second direction parallel to the surface of the substrate and perpendicular to the first direction, the central microguide being situated in the prolongation of the input microguide, and excitation means (36, 38, 44, 46, 40, 48) to bring the free extremity of the central microguide of the girder into the prolongation of one of the output microguides.

22 Claims, 7 Drawing Sheets

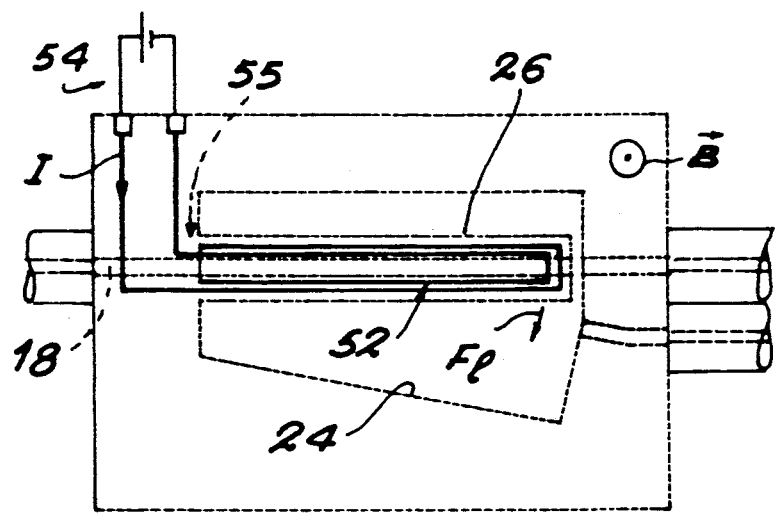
FIG. 5
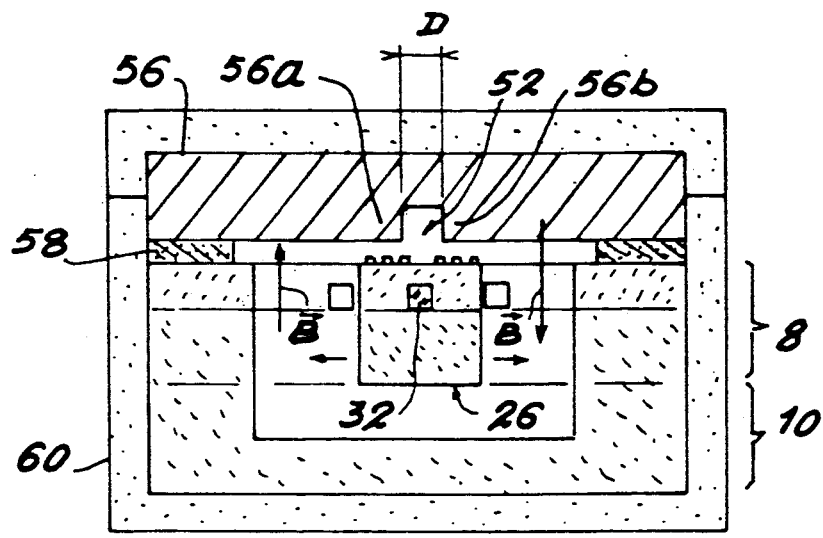
FIG. 6A
FIG. 7
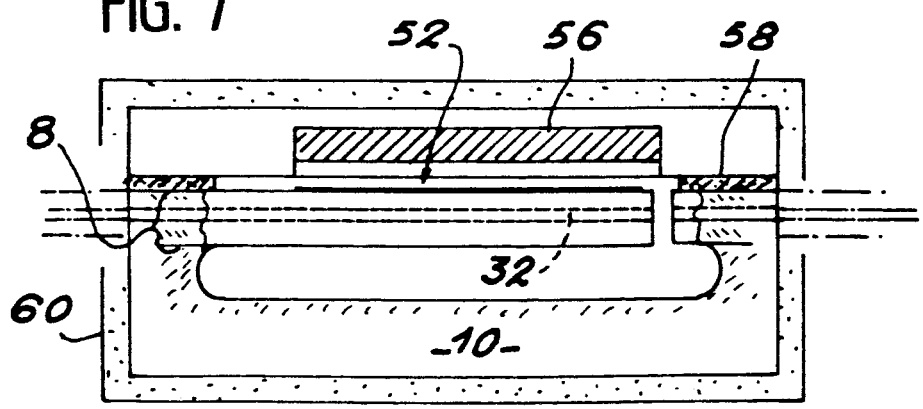

SWITCH AND SYSTEM FOR SWITCHING INTEGRATED OPTICAL MULTICHANNELS AND SWITCH PRODUCTION METHOD

FIELD OF THE INVENTION

The invention concerns an optical multichannel switch embodied with integrated optics for switching luminous beams, a switching system comprising several optical switches, as well as a method for embodying these switches.

BACKGROUND OF THE INVENTION

The invention can be used in particular in applications for the real time processing of radar signals, for example in correlators, spectrum analyzers or interferometers, in optical channel telecommunications applications and in optical fiber sensor applications.

Generally speaking, the invention can be applied to any system requiring to connect M luminous points to N output points with M and N being whole numbers $\geq 1$. In particular, the switch may be used to bring the light supplied by luminous sources, such as laser diodes, to photodiode type bars of detectors. Similarly, the switch is able to ensure the transfer of a luminous signal carried by any optical fiber of a set of optical fibers, generally monomode fibers, to any fiber of another set of optical fibers.

Currently known switches with integrated optics use successive switchings suitably associated and constituted by microguides. The transfer of the light from one microguide to another microguide is ensured via the interaction of the luminous signal to be switched with an electric field generated by electrodes placed opposite the microguides.

These switches are described in the article in Electronics Letters, July 1986, vo. 22, No 15 by P. Granestrand and al and entitled "Strictly non blocking $8 \times 8$ integrated optical switch matrix", p. 816–818 and in the article by G. A. Bogert and al and entitled "Low crosstalk $4 \times 4$ TiLiNbO$_3$ optical switch with permanently attached polarization maintaining fiber array" in the Journal of Lightwave Technology, vol. LT-4, No 10, October 1986, p. 1542–1545.

These devices have the advantage of using relatively weak control electric powers. On the other hand, they may only be embodied on materials having electro-optical properties, such as LiNbO$_3$. In particular, glass or silica type amorphous materials or even silicon cannot be used. Furthermore, owing to the "waterfall" disposition of the various microguides, all the combinations to transmit a luminous signal from one microguide to another are not equivalent. Finally, the control of these switchings is often complex and this complexity increases with the number of inputs and outputs.

SUMMARY OF THE INVENTION

The object of the invention is to provide a switch and an optical multichannel switching system and a method to embody this switch making it possible to overcome the various drawbacks mentioned above. In particular, all the luminous signal transfer combinations are equivalent and amorphous materials may be used to constitute the switch and the optical switching system.

In addition, the technical embodiment of the switch and the switching system is much simpler than those of the prior art, thus resulting in an improved reproducibility of the devices of the invention compared with that of known devices.

The object of the invention is to also provide a reversible optical integrated multichannel switch comprising a) a monocrystalline substrate, b) at least one buffer film supported by the substrate, c) at least one recess made in the substrate and the buffer film, d) at least one optical input microguide supported by the buffer film and orientated along a first direction parallel to the surface of the substrate so as to carry an incident luminous beam to be switched, e) at least two adjacent optical output microguides roughly parallel to the first direction and supported by the buffer film so as to carry the switched luminous beam, the output and input microguides being disposed on both sides of the recess and in their prolongation, f) at least one flexible girder defined in the buffer film and equipped with an optical central microguide over its entire length and orientated along the first direction, the girder comprising one fixed extremity integral with the substrate, and one free extremity able to deform in said recess along a second direction parallel to the surface of the substrate and perpendicular to the first direction, the central microguide being situated inside the prolongation of the input microguide, and g) excitation means for generating deformations of the girder along the second direction so as to bring the free extremity of the central microguide inside the prolongation of one of the output microguides and thus switch the incident beam.

The input and output microguides and the central microguide are obtained by etching with a given film. In addition, the input microguide and the central microguide form a single microguide.

The switch of the invention is irreversible, that is the input and output microguides are able to act as output and input microguides respectively. In this case, the fixed extremity of the girder is found opposite the output microguides.

The deformations of the girder in the recess made in the substrate and the buffer film may be due to either a capacitive effect (generally small) or more favorably to an inductive effect (Laplace force). The forces generated by these excitation means need to be sufficiently strong so as to ensure a movement of the girder along the second direction by several micrometers and indeed several tens or hundreds of micrometers for a switching matrix.

The use of the capacitive effect or inductive effect depends on the specific application envisaged (number of switching channels), as well as the shape and weight of the flexible girder.

The switch of the invention may simply constitute a switching matrix connecting M luminous input points to N output points. To this effect, the optical switch of the invention includes at least two adjacent input microguides roughly parallel to the first direction, at least two optical output microguides, two distinct recesses, namely one first and one second recess made in the substrate and the buffer film and disposed with one being an extension of the other between the input and output microguides, one first girder and one second girder, both rendered integral via their fixed extremity and disposed with one being an extension of the other so that their central microguides are in coincidence and orientated along the first direction, the free extremity of the first girder being able to deform in the first recess and the free extremity of the second girder being able to deform in the second recess, first means to generate deformations of the first girder so as to bring the free extremity of its central microguide into the prolongation of one of the input microguides, and second means to generate deformations of the second girder so as to bring the free extremity of its central microguide into the prolongation of one of the output microguides.

Advantageously, the input and output microguides are disposed fan-shaped. Thus, the input microguides enable the incident beams to be switched to be brought close to the girder and the output microguides make it possible to distance the switched beams. This makes it possible to increase the number of input and output microguides and thus the number of beams to be switched and their switching directions with a control power equal to the deformations of the girder and also allows for a possible connection with the optical fibers requiring a minimum spacing fixed by the diameter of the fibers.

Generally speaking, the optical switch of the invention is applicable to any type of material. In particular, it may be embodied on a lithium niobate substrate with microguides obtained by titanium diffusion; on a glass substrate, the microguides then being obtained via the ionic exchange of Ag, Cs or Tl; on silicon or even on III-V compounds, the microguides then being obtained by epitaxy techniques.

Advantageously, the optical switch comprises a silicon substrate provided with a silica buffer film, undoped or doped with dopers reducing its refraction index, such as fluorine or boron or increasing it slightly, such as phosphorus, germanium and titanium, silicon nitride microguides or possible silicon oxynitride microguides $SiO_x N_y$ with $0<x<2$ and $0<y<4/3$ or preferably silica microguides doped with dopers increasing its refraction index, such as titanium, nitrogen, germanium or phosphorus dopers with a value allowing for a larger microguide index than that of the buffer film. In addition, the entire structure is coated with a silica film, undoped or doped with dopers reducing its index. This silica film makes it possible to ensure a proper confinement of the light and an optical insulation of the substrate.

The advantage of using structures of an $Si/SiO_2/SiO_2$ doped $+/SiO_2$, known as the structure A, or $Si/SiO_2/Si_3N_4/SiO_2$, known as the structure B, is linked to the accurate technological control of these materials and in particular to their fully controlled etching, which makes it possible to obtain a completely defined optical switch with excellent optical qualities.

The structure A is generally used in monomode applications and the structure B is used in multimode applications.

The invention also concerns a reversible multichannel integrated optics switching system comprising several waterfall-disposed optical switches, such as those defined earlier.

The invention also concerns a method to embody an optical switch, such as the one defined previously, comprising the following stages:

a) formation of at least one buffer film on the substrate equipped with a central microguide over its entire length and orientated along the first direction, and at least one output microguide roughly parallel to the central microguide and extending over only one portion of the buffer film, b) embodiment of a mask above the buffer film defining the forms of the recess and the girder respectively, this mask masking the major part of the central microguide, c) etching of the buffer film as far as the substrate so as to form the girder, and d) partial isotropic etching of the substrate so as to free the top of the girder and form the recess, this etching being embodied over a depth exceeding $l$ where l represents the width of the girder measured along the second direction but smaller than the overall thickness of the substrate, e) elimination of the mask, and f) embodiment of means for exciting the girder.

Preferably, the buffer film is etched anisotropically so as to have rectangular-shaped girders, this dry anisotropic etching with silica being well-known to experts in this field. However, a quasi-isotropic attack may be envisaged, especially in the case of inductive effect girder excitation means.

BRIEF DESCRIPTION OF THE DRAWINGS

Other characteristics and advantages of the invention shall appear more readily from a reading of the following description, given by way of illustration and being non-restrictive, with reference to the accompanying drawings on which.

DETAILED DESCRIPTION OF THE PREFERRED EMBODIMENTS

Figure 1:
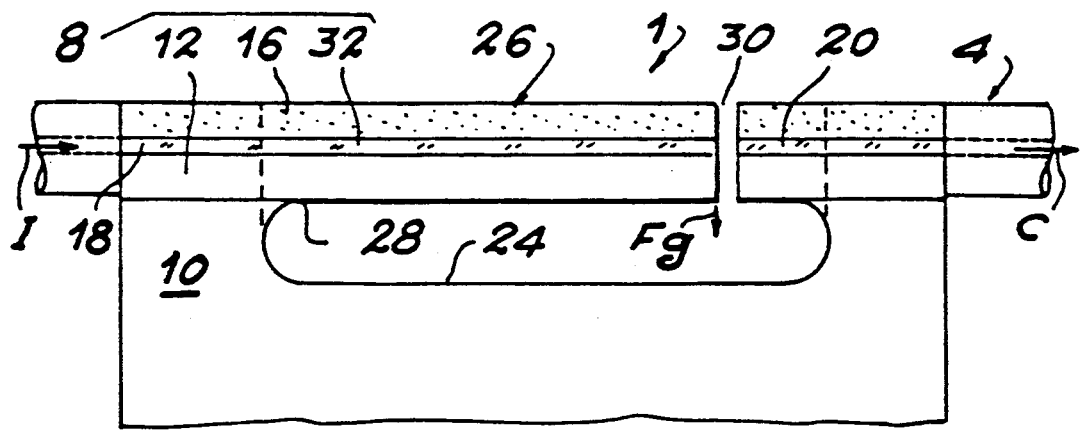
FIG. 1 diagrammatically represents a longitudinal section of an optical switch conforming to the invention.
Figure 2:
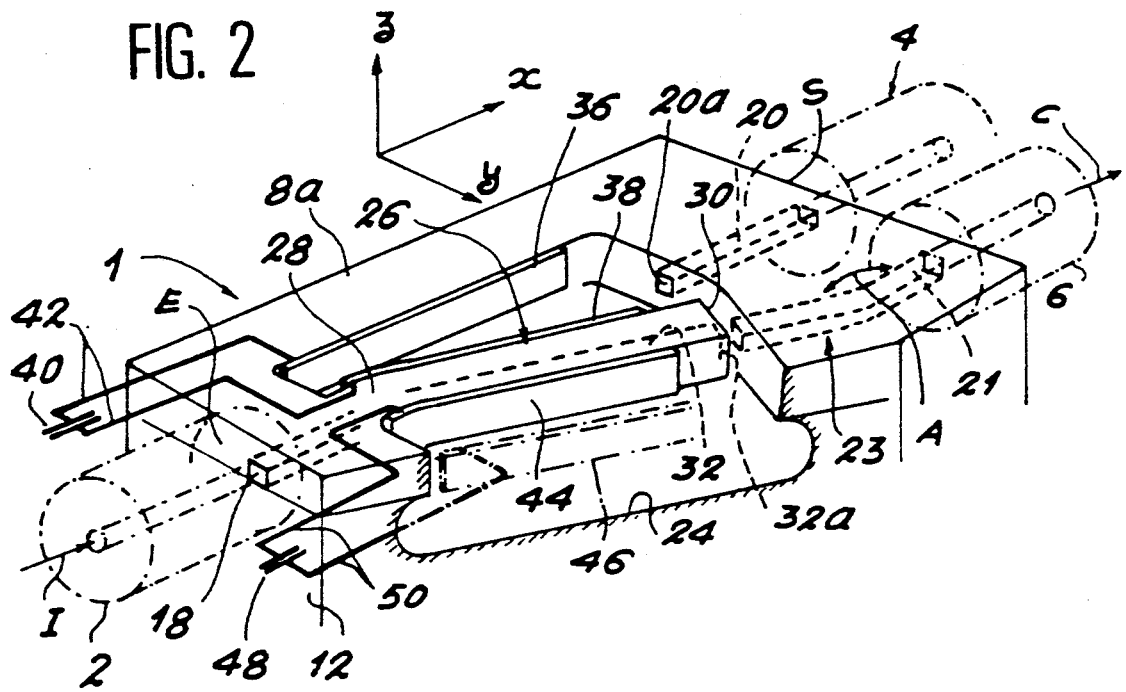
FIG. 2 is a perspective view of a switch conforming to the invention and showing a system for the capacitive control of deformations of the girder.
Figure 3:
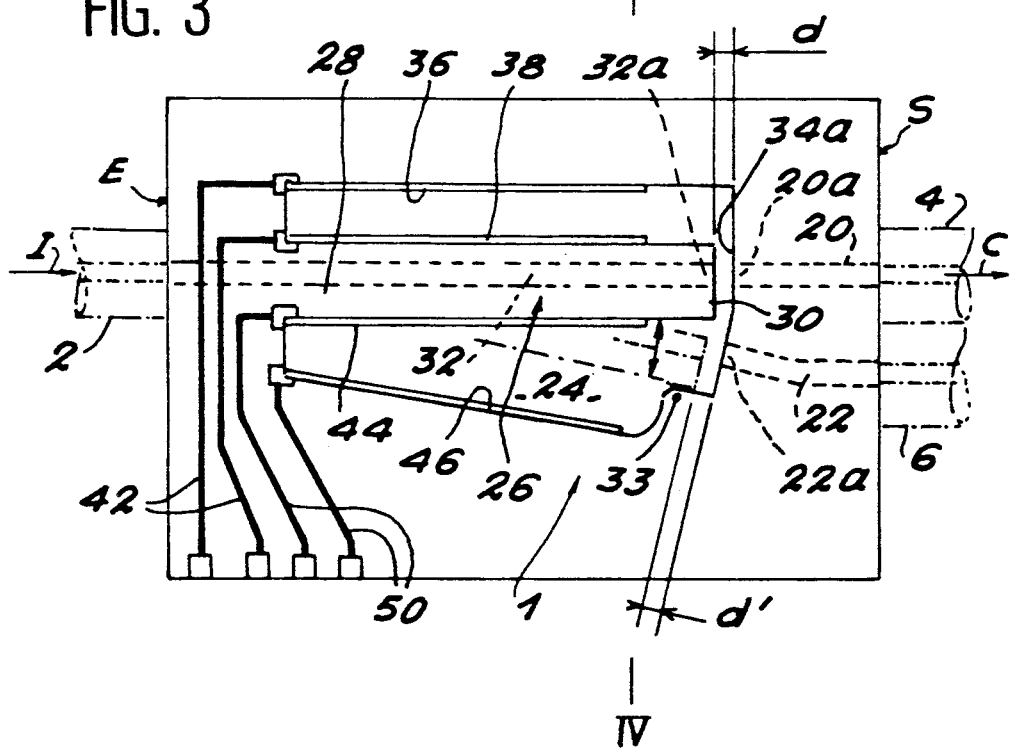
FIG. 3 is a top view of the switch of FIG. 2, FIG. 4 diagrammatically illustrates the various stages for embodying a switch conforming to the invention along the direction IV—IV of FIG. 3, FIG. 5 diagrammatically represents a top view of a switch conforming to the invention and in which the girder excitation means are of the inductive type, FIGS. 6A, 6B and 7 diagrammatically represent transversal and longitudinal sections of the means enabling a magnetic field to be applied perpendicular to the surface of the substrate.

FIGS. 1 to 3 show an optical switch 1 conforming to the invention and used to switch an incident beam I along two directions.

The luminous beam to be switched is carried by a monomode fiber 2, such as a silica fiber, and the switched beam C comes out of the switch via a first monomode fiber 4 or a second monomode fiber 6, also made of silica.

According to the invention, the switch includes a guide structure 8 embodied on a monocrystalline silicon substrate 10 and having one input face E and one output face S, both strictly parallel, obtained by cleavage.

The guide structure 8 comprises a non-doped silicon oxide buffer film 12 with a thickness of between 8 and 12 micrometers, silicon oxide microguides doped by titanium, and an upper non-doped silica film 16 with a thickness of between 2 and 10 micrometers, this film being able, for certain applications, to be replaced by air.

The switch shown on FIGS. 2 and 3 comprises a input microguide 18 and two output microguides 20 and 22, all with a height of between 2 and 6 micrometers and a width of between 2 and 8 micrometers. The microguides 18 and 20 are parallel to a direction x parallel to the largest surface 8a of the guide structure. The microguides 18 and 20 are disposed with one being an extension of the other and on both sides of a recess 24 traversing the guide structure 8 and extending as far as the substrate.

The output microguide 22, situated one the same side of the recess 24 as the microguide 20 and adjacent to the latter comprises on the side of the output S of the switch a section 21 strictly parallel to the microguide 20 and, on the side of the recess 24, a section 23 forming a re-entering angle A with the section 21 with a value of between 0.06° and 6° approximately, this value being linked to the length of the girder.

Thus, the input extremities 20a and 22a respectively of the output microguides opening into the recess 24 are closer to each other than their output extremity levelling on the output face S of the guide structure 8.

The input extremities 20a and 22a of the output microguides are normally distant by 10 to 20 micrometers, whereas the output extremities of these microguides are distant by about 125 mcirometers so as to be able to be connected respectively to the output fibers 4 and 6, which generally have a relatively large outer diameter of about 125 micrometers.

The recess 24 defines a flexible girder 26 orientated at rest parallel to the direction x. This girder 26 may deform in the recess 24 along a direction y parallel to the surface 8a of the guide structure and perpendicular to the direction x. This girder 26 includes one fixed extremity 28 integral with the guide structure 8 and the substrate 2, and one free extremity 30 able to deform inside the recess 24.

The girder 26 is defined in the guide structure 8 and is provided with a central microguide 32 extending over its entire length and orientated at rest parallel to the direction x. This central microguide 32 is disposed in the prolongation of the input microguide 18 so that their longitudinal axes parallel to the direction x are merged.

In actual fact, the input microguide 18 and the central microguide 32 of the girder constitute the same single microguide (FIG. 1).

The switching of the incident beam carried by the input microguide 18 towards the output microguide 20 is ensured by bringing the free extremity 32a of the central microguide of the girder opposite and in coincidence with the input extremity 20a of the output microguide 20. This particular configuration is shown on FIG. 1.

In accordance with the invention, the internal wall of the recess 24 opposite the free extremity 30 of the girder (FIG. 3) is constituted by two sections 34a and 34b forming a re-entering angle with a value close to or identical to the angle A so that the distance d separating the extremity 32a of the central microguide 32 and the input extremity 20a of the microguide 20 when the girder 26 is opposite the microguide 20 is equal to the distance d' separating the extremity 32 of this central microguide and the extremity 22a of the output microguide 22 when the girder 26 is opposite the output microguide 22. This ensures equivalence of the two optical switching directions. This disposition further ensures the parallelism of the extremity 22a of the microguide and the wall 34a of the recess.

For a type A guide structure, the distances d and d' need to be less than 10 micrometers and, for example, equal to between 5 and 8 micrometers for a coupling or more than 80%.

For type B guide structures, the distances d and d' need to be at the most equal to 2 micrometers for a coupling exceeding 80%. The structure A is less penalizing than the structure B.

In accordance with the invention, the deformations of the girder so as to bring the extremity 32a of the central microguide in coincidence with either the extremity of the output microguide 20 or with the extremity 22a of the microguide 22 is ensured in the embodiment shown on FIGS. 2 and 3 with the aid of variable-capacity capacitors.

To the effect, the lateral surfaces of the recess 24 at the level of the guide structure 8 and orientated along the direction x are equipped with metallizations 36 and 46 respectively. In addition, the lateral faces of the girder 26 opposite and orientated along the direction x when the latter is at rest are equipped with metallizations 38 and 42 respectively.

The opposing metallizations 36 and 38 constitute the armatures of a first variable capacity capacitor to which a voltage is able to be applied by means of an electric power source 40 electrically connected to these armatures via conductors 42 disposed on the surface 8a of the guide structure 8.

Similarly, the opposing metallizations 44 and 46 constitute the armatures of a second variable capacity capacitor to which a voltage is able to be applied by means of an electric power source 48 connected with the aid of conductive wires 50 disposed on the surface 8a of the guide structure.

By applying a suitable voltage to the terminals of these capacitors, a capacitive force Fc is created parallel to the direction y resulting in a deformation of the girder 26 along this direction y. This capacitive force Fc depends on the characteristics of the capacitors and is governed by the equation:

$$Fc = \tfrac{1}{2}\epsilon S V^2 / e^2$$

where $\epsilon$ is the dielectric constant of the air (about 10–11); V is the voltage applied; e is the average distance separating the metallizations 36 and 38 and 44 and 46 respectively and S is the surface of the opposing metallizations.

In particular, $S = L \times h$ where L represents the length of the girder measured along the direction x, and h its thickness measured along the direction z perpendicular to the plane xy.

This capacitive force Fc allows for a lateral displacement x of the free extremity of the girder 26 along y given by the equation:

$$x_c = 3/2 Fc.h^{-1} (L/1)^3 . E^{-1}$$

where E is the Young module ($7.10^{10}$ N/m$^2$ for the silica) and l represents the width of the girder measured along the direction y.

The following table I gives lateral displacement examples $x_c$ for various values of the voltage applied to the capacitors and various values of the average distance e separating the armatures of these capacitors. In these examples, the girder would have the following dimensions: $L = 5$ mm and $l = h = 30$ μm.

The capacitive forces are slight and may be mainly implemented for a two-position optical switch, as shown on FIGS. 2 and 3, or for a slight complexity switching matrix with $N = 2$ or 3 and $M = 2$ or 3. In practice, V shall be taken to be between 30 and 40 volts and e roughly between 15 and 20 μm.

So as to ensure an acceptable positioning of the central microguide 32 with respect to the output microguide 20 or 22 and thus a fully acceptable light transfer, it is essential that the force Fg (FIG. 1) which acts on the girder 26 has an extremely slight effect. This force may be the gravity force or the resultant of the forces applied to the girder (gravity, acceleration or other forces).

The acceptable deformation along the direction at the girder end noted Zg needs to be as small as possible and in practice less than 0.5 micrometers for an A type structure. When above 0.5 micrometers, the coupling coefficient between the central microguide and the output microguides remains more than 90% of its theoretical value.

For a B type structure, Zg needs to be less than 0.05 micrometers.

The girder end deformation Zg is expressed according to the corresponding force Fg, in this case to the gravity force, according to the equation:

$$Zg = 3/2 \, Mg. l^{-1} (L/h)^3 . E^{-1}$$

where l, L, h and E have the same significance as mentioned previously, g represents the acceleration of gravity and M is the mass of the girder and is equal to $\rho . l . L . E$ with $\rho$ being the density amounting to about 2000 kg/m for the silica.

For an A monomode structure, $h = l = 30$ micrometers is selected, which gives $Zg = 0.0476 \times 10^4 . L^2$ with L in meters. The condition $Zg < 0.5$ micrometers results in L then being at the most equal to 5 mm.

In these conditions, for $L = 1$ mm, $Zg = 4.76.10^{-4}$ μm is obtained, and $Zg = 4.7$ μm is obtained for $L = 10$ mm.

For a multimode structure, the values of l and H, as well as those of L, are higher; they are deduced from the characteristics of the optical multimode fibers used.

Figure 4:
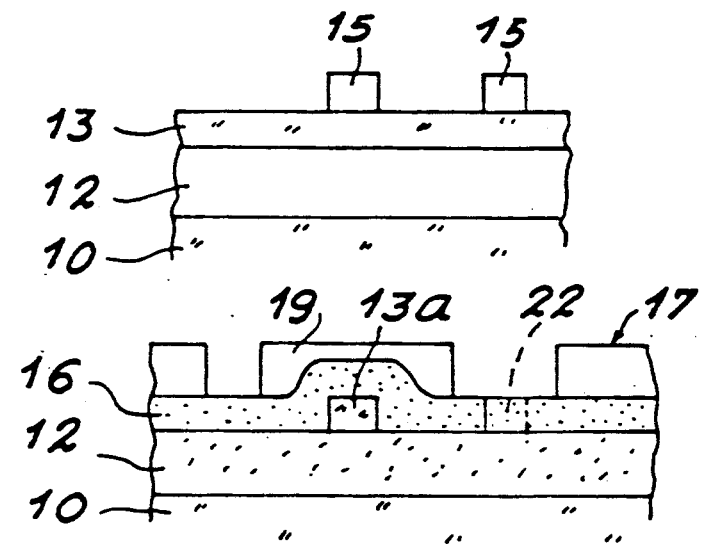
Figure 4:
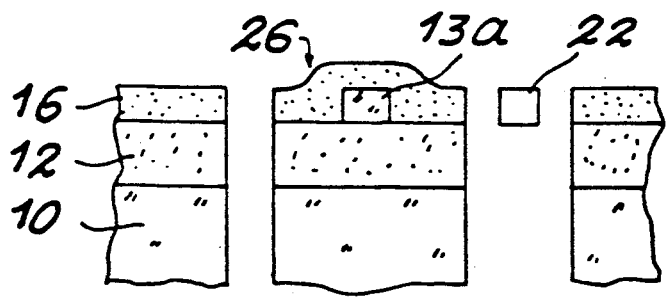
Figure 4:
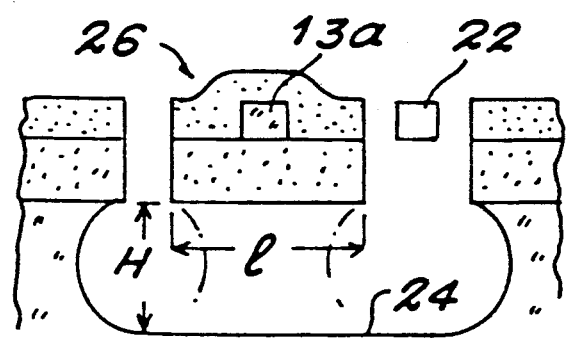

FIG. 4 diagrammatically shows the stages for embodying the switch of the invention.

The first stage of the method, shown on section a of FIG. 4, consists of embodying the guide structure. Also, after forming of the buffer film 12 by the thermic oxidation of the substrate 10 in an oxygen atmosphere of between 800° and 1200° C. or also by assisted CVD or non-plasma depositing, a silica guide film 13 is deposited by LPCVD or PECVD (plasma-assisted CVD) which is doped with phosphorus, for example.

Then by means of conventional photolithography methods, a positive resin mask 15 is embodied masking firstly the central region of the doped silica film 13 it is desired to retain in order to constitute the central microguide 32 of the girder, the input microguide 18 and the output microguide 20, both parallel to the direction x, and secondly the region intended to constitute the output microguide 22.

Then an ionic type reactive anisotropic etching is made of the doped silica film with CHF$_3$ at an excitation frequency of 13.6 MHz of the reacting agent; the etching is effected over the entire thickness of the film 13.

The reference 13a indicates the etched portion of the film 13 which, after etching of the girder, shall constitute the central microguide 32 of the girder, the input microguide 18 and the output microguide 20.

After the mask 15 has been eliminated with oxygen plasma, the upper film 16, as shown on portion b of FIG. 4, is deposited on the entire structure by means of the low pressure chemical vapor phase depositing technique (LPCVD) or assisted-plasma technique (PECVD).

Then a new resin mask 17 is embodied by conventional photolithoetching methods and comprising openings 19 defining the shape and dimensions of the recess 24 and the girder 26. In particular, this mask 17 masks the major part of the microguide 13a.

Then a reactive ionic type anisotropic etching is made of the stacking of the silica films 16, 13 and 12 as far as the substrate 10 with CHF$_3$, for example, and an excitation frequency of 13.6 MHz of the reacting agent. The structure obtained is the one shown on portion c of FIG. 4.

Then a deep but partial isotropic etching is made of the silicon by using the mask 19, as well as the etched silica structure as a mask. The etching of the substrate is effected with a selectivity in excess of 100 by using, for example, the reactive ionic etching technique with SF$_6$ and an excitation frequency of the reacting agent of normally 2.4 GHz.

The final structure is the one shown on portion d of FIG. 4.

So as to fully free the girder 26 from below, it is essential that the etching depth H separating the bottom of the girder 26 and the bottom of the recess 24 is greater than ½. In practice, for more safety, H is selected as being equal to at least 1.

With the method of the invention, the problem of vertically aligning the microguides to be switched does not arise as the latter are embodied at the same time on the substrate by means of successive depositings of the buffer film 12, the guide film 13 and the coating film 16, which are then separated by etching when etching the girder.

The next stages for embodying the switch of the invention concern the production of the means for controlling deformations of the girder.

In a capacitive control system, the armatures of the capacitors 36–38, 44–46 and the power leads 42 and 50 to these capacitors are embodied independently and successively. The armatures are obtained directly by evaporation under vacuum or by pulverizing a metal under an oblique incidence by using a suitably-shaped mechanical mask. The power leads are obtained by depositing a metal on the whole structure and by etching this deposit according to the desired patterns by using a suitable resin etching mask.

These armatures and power leads are made of aluminium.

In accordance with the invention, it is also possible to ensure deformations of the girder 26 along the direction y by means of the inductive effect. One corresponding embodiment is shown at the top on FIG. 5.

The optical switch shown on FIG. 5 differs from the one shown on FIGS. 1 to 3 solely by the means for exciting the girder 26.

To this effect, several spires 52, in this case 3, are disposed on the surface of the girder (parallel to the plane xy) and fed with a current $\vec{I}$ by an electric power source 54. A magnetic field $\vec{B}$ orientated perpendicular to the plane xy of the switch generates a force $\vec{F1}$ (Laplace force) along the direction y.

In accordance with the invention, the conductive wires constituting the winding 52 are obtained by depositing a metal and in particular aluminium on the entire structure, this metal then being etched according to the desired patterns with the aid of a suitable photolithographic mask. A block of nonconductors 55 needs to be provided at the intersection of the various spires so as to electrically insulate the conductive wires which are intercepted.

Figure 6:
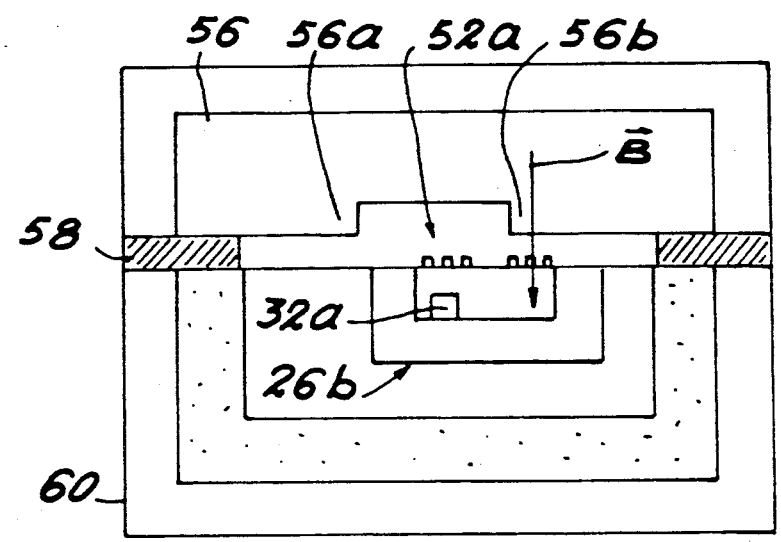

The magnetic field $\vec{B}$ is created with the aid of a magnet 56 disposed for example, as shown on FIGS. 6A and 7, on a peripheral nonconducting support wall 58 taking support on the periphery of the guide structure 8. The two poles 56a and 56b of the magnet are situated above the winding 52. The magnet may be kept above the switch by means of a nonconducting casing 60.

The distance separating the poles 56a and 56b and noted D needs to be less than or equal to the width 1 of the girder 26.

Given the fact that the available cobalt/samarium magnets are unable to be miniaturized to the extreme and generally have an airgap D of several millimeters, it is necessary that the girders have a width of several millimeters and especially 3 millimeters. Also, for a given length, the girder controlled by the inductive effect is 100 times heavier than the girder controlled via the capacitive effect. Also, it is necessary to lighten the induction-controlled flexible girder.

Figure 8:
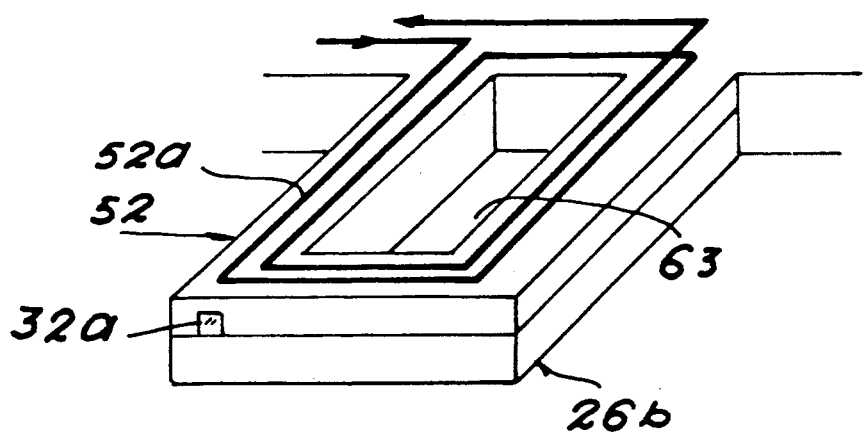
FIGS. 8A and 8B are two variants for the embodiment of the girder of a switch conforming to the invention and equipped with inductive girder excitation means.
Figure 8A:
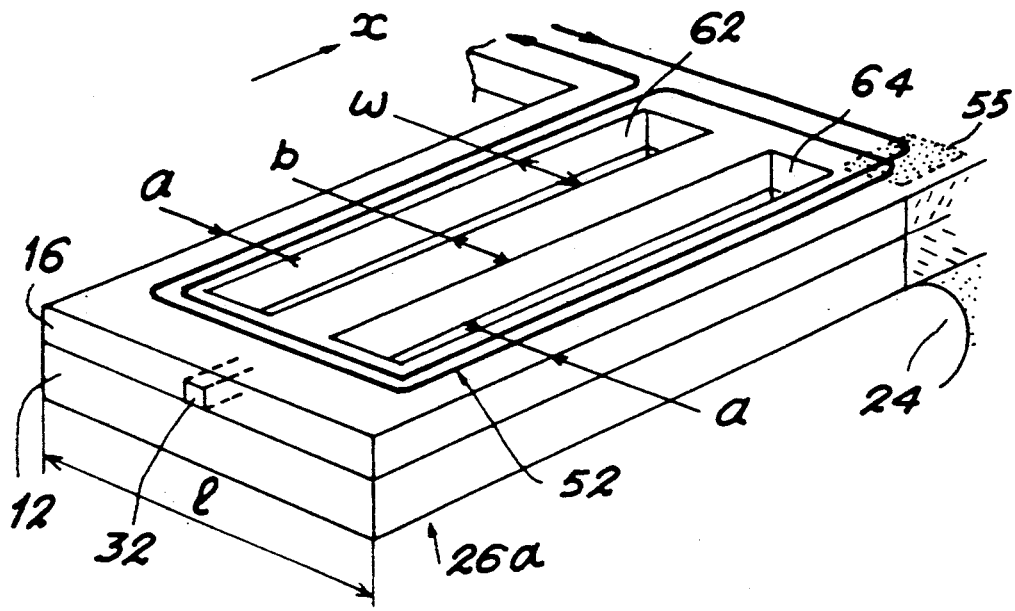

One first solution is shown on FIG. 8A. For reasons of simplicity, only the girder is shown on this figure.

The flexible girder with the general reference 26a is hollowed over its entire thickness measured along z by two elongated lateral recesses 62 and 64 whose longitudinal axis is parallel to the direction x when the girder is at rest. These recesses 62 and 64 are disposed on both sides of the central microguide 32 of the girder 26a and ensure a lightening of the girder.

By way of example, the distance separating the recesses 62 and 64 of the main recess 24 varies from 100 to 500 micrometers; the distance b separating the two recesses 62 and 64 is about 30 micrometers and the width w of the recesses 62 and 64 is about 1 millimeter for an overall girder width 1 of 3 millimeters.

The lightening of the girder defined by the total weight of the girder without any recess/total girder weight with recess ratio is proportional to $\frac{1}{2}a$. Also, for a girder width of 3 millimeters and a distance a of 500 micrometers, the lightening is 3. Similarly, for a girder width of 3 millimeters and a distance a of 100 micrometers, the lightening is 15.

One second solution corresponding to FIGS. 6B and 8B consists of using a magnet with one of its poles 52b being situated facing the portion 52a (for example) of the winding 52, the other pole 52a being situated well beyond the girder 26b which is then the smallest girder (about 100 μm) and thus lightened.

The embodiment of the girder 26b of FIG. 8B differs from that of FIG. 8A by virtue of the presence of a single central recess 63 ensuring a lightening and by virtue of the lateral position of the microguide 32 of the girder.

Of course, this solution has the drawback of reducing the force applied to the girder by a factor of 2.

Figure 9:
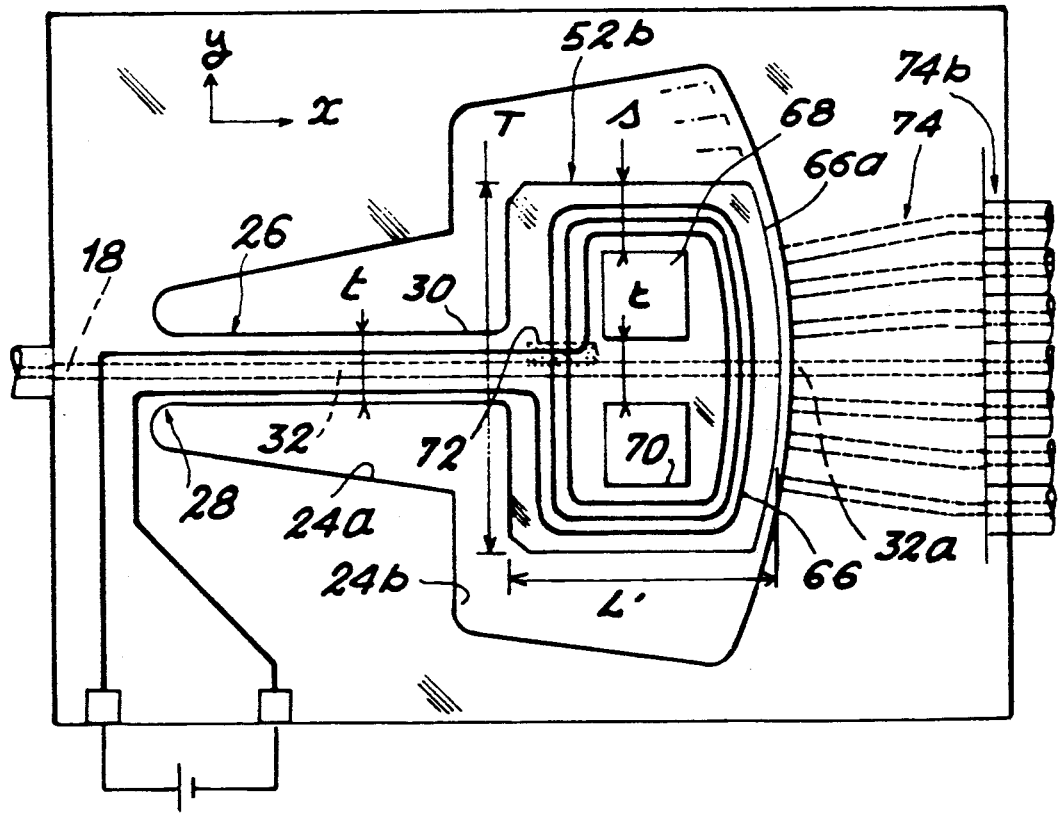
FIG. 9 is another embodiment of a switch conforming to the invention and equipped with inductive girder excitation means, FIG. 10 diagrammatically represents a top view of a switching matrix conforming to the invention, FIG. 11 diagrammatically represents a top view of an embodiment variant of the girder of the switch according to the invention, FIG. 12 diagrammatically represents a top view of another embodiment variant of the girder of the switch according to the invention, FIG. 13 diagrammatically represents a top view of another embodiment variant of a switch conforming to the invention and equipped with a recall girder, and FIG. 14 diagrammatically represents a top view of a switching system conforming to the invention and comprising two waterfall-disposed optical switches.

One third possibility for lightening of the girder, when an inductive effect is employed, is shown on FIG. 9.

This figure shows the flexible girder 26 bearing at its free extremity 30 a block 66 also embodied in the silica guide structure intended to deform along the direction y by means of the Laplace force. This block has a thickness h equal to the thickness of the girder but is wider than the girder 26. The central microguide 32 of the girder 26 extends into the block 66 as far as its free extremity.

This block is equipped with two lateral recesses 68 and 70 disposed symmetrically on both sides of the central microguide 32.

So as to allow for deformations of the block along y, the main recess 24a, defined in the guide structure and the substrate, needs to comprise a widened portion 24b along the direction y opposite the block 66.

A winding 52b, laid on the surface of the block 66 parallel to the plane xy and whose power leads extend onto the girder along the direction x, makes it possible, when this winding is traversed by an electric current $\vec{I}$ and a magnetic field $\vec{B}$ is applied perpendicular to the surface of the block 66, to create a Laplace force along the direction y.

The deformations on one side or the other of the block 66 along the direction y are ensured by modifying the direction of circulation of the current in the winding (or of the magnetic field applied).

An electric nonconducting block 72 is provided at the interception point of the winding spires.

The two recesses 68 and 70 made on the entire silica guide structure in the block 66 make it possible to lighten the unit whilst increasing the overall length of the flexible section 26–66. In addition, they allow the Laplace force to be optimally used concentrated at the free extremity of the girder.

On FIG. 9, t represents the width of the girder measured along the direction y. This distance is also equal to the one separating the two recesses 70 and 68 of the block 66. T represents the overall width of the block 66 measured along the direction y. L' represents the length of the block 66 measured along the direction x, and s represents the distance separating each recess 68 or 70 of the portion 24b of the main recess measured along y.

In accordance with the invention, the distance separating the main recess from the lateral recesses of the girder (a FIG. 8) or from the terminal block (s, FIG. 9) shall enable several spires of 10 micrometers to be etched and separated from each other by 10 μm. Let K be the number of spires and a and s shall be greater than 20(K+1).

The block 66 is subjected to a Laplace force $F_L$ equal to 2BKIL' and the displacement due to this force noted $x_L$ is given by the equation:

$$x_L = 4F_L \cdot h^{-1} \cdot (L/l)^3 \cdot E^{-1}.$$

In the configuration shown on FIG. 9, the minimum acceptable displacement along z, due to the gravity force, is equal to $4 \text{ Mgl}^{-1} (L/h)^3 E^{-1}$. In this equation, M represents the weight of the block 66. In addition, this equation has been determined by assuming that the weight M is punctual and is situated at the end of the girder.

By disregarding the weight of the girder before that of the block 66, $Zg = 22 L^3$ is obtained. Also, for $L = 1$ mm, $Zg = 22$ nm is obtained and for $L = 3$ mm, $Zg$ is equal to 0.6 micrometers.

In the table II shown hereafter, examples appear of $x_L$ for various girder lengths L and various number of spires of the winding 52a. The results entered in this table have been drawn up for the following values: $h = t = 30$ micrometers, $s = 100$ micrometers, $T = 3$ millimeters and $L' = 1$ millimeter. The value of the magnetic field $\bar{B}$ was 1 tesla and the intensity of the current traversing the winding 52b was 10 milliamperes.

Contrary to the case with the other embodiments described previously, the optical component shown on FIG. 9 may be used for a complex switching matrix. The determination of x makes it possible to calculate the number of input and output microguides.

This component allows for the switching of an incident beam carried by an input microguide 18 situated at the center of the structure and in the prolongation of the central microguide 32 of the girder 26 and the block 66 towards one of the seven output microguides 74.

In accordance with the invention, these output microguides 74 are disposed fan-shaped, the distance separating them widening from their input 74a towards their output 74b.

So as to ensure a constant distance between the extremity 32a of the central microguide of the girder/block unit and the input extremities 74a of the output microguides, it is possible, as shown on FIG. 9, that the wall 24c of the recess 24a, which trims flush the extremity 74a of the microguides, and the face 66a of the block 66 opposite orientated roughly along the direction y, have the shape of concentric arcs of a circle centered on the fixed extremity 28 or hinge of the flexible girder 26.

Figure 10:
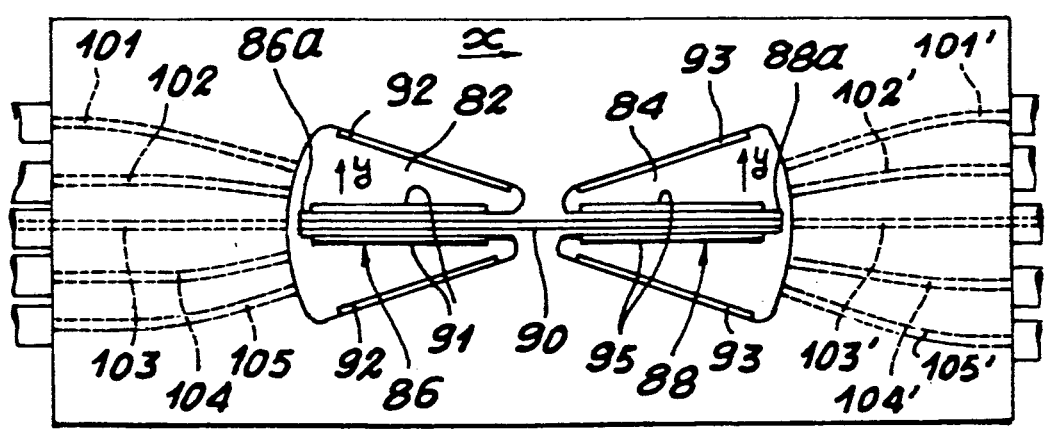

According to the invention, it is also possible to embody a switching matrix, such as the one shown on FIG. 10. This matrix comprises several input microguides 101, 102, 103, 104, 105 and several output microguides 101', 102', 103', 104' and 105' to be coupled to the input 78 and output 80 optical fibers respectively.

The input microguides are disposed fan-shaped widening from their output towards their input so as to ensure connection with the optical input fibers. Similarly, the output microguides are disposed fan-shaped widening from their input towards their output so as to ensure connection with the optical output fibers 80. These input and output microguides are roughly parallel to the direction x.

This switch further comprises two distinct recesses 82 and 84 made in the guide structure and substrate and disposed with one being an extension of the other between the input and output microguides. Two flexible girders 86 and 88, integral with each other via their fixed extremity and disposed with one being an extension of the other along the direction x, are able to deform in the recesses 82 and 84 respectively along the direction y. They comprise a central microguide which in fact constitutes a sole central microguide 90.

In picture form, the recesses 82 and 84 represent the deployed wings of a butterfly whose body constitutes the hinge of the girders 86 and 88.

These girders 86 and 88 may deform independently. To this effect, metallizations are provided on the lateral faces 91 and 95 respectively of the girders 86 and 88 and on the lateral faces 92 and 93 respectively of the recesses 82 and 84 opposite so as to define two variable-capacity capacitors for each girder.

FIG. 10 shows the switching of the incident beam conveyed by the input microguide 103 towards the output microguide 103' via the central microguide 90 of the flexible girders.

Of course, the deformations of the girders 86 and 88 along the direction y may also be obtained via the inductive effect, as described previously.

Figure 11:
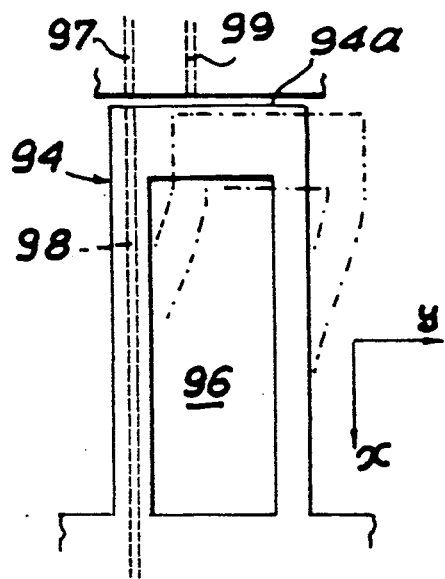
Figure 12:
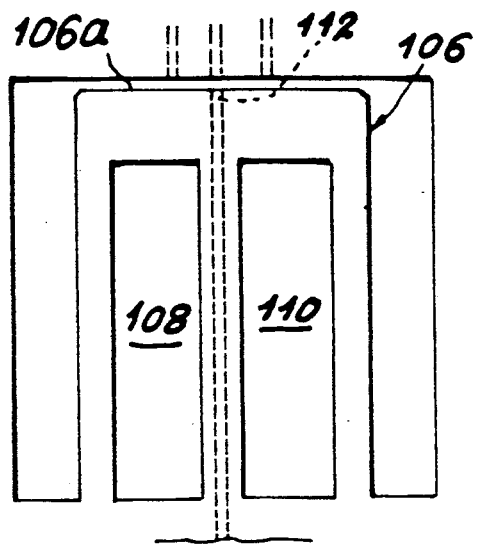

In accordance with the invention, various shapes of flexible girders may be envisaged, as shown on FIGS. 11 and 12.

On FIG. 11, the flexible girder 94 is relatively wide and comprises a central recess 96 orientated parallel to the direction x and thoroughly traversing the silica guide structure. One of the longitudinal arms of the girder is equipped with a central microguide 98 intended to be brought into the prolongation of the output microguides 97 and 99 via the deformation of the girder along the direction y.

On FIG. 12, the flexible girder 106 is also wide and comprises two lateral recesses 108 and 110 made in the guide structure and disposed symmetrically with respect to the central microguide 112 and extending along the direction x.

The deformations of the girders (FIG. 11) and 106 (FIG. 12) may also be ensured via a capacitive effect as well as an inductive effect. In these embodiments, the free extremities 94a and 106a respectively of the girders remain parallel to the direction y during deformations of these girders.

Figure 13:
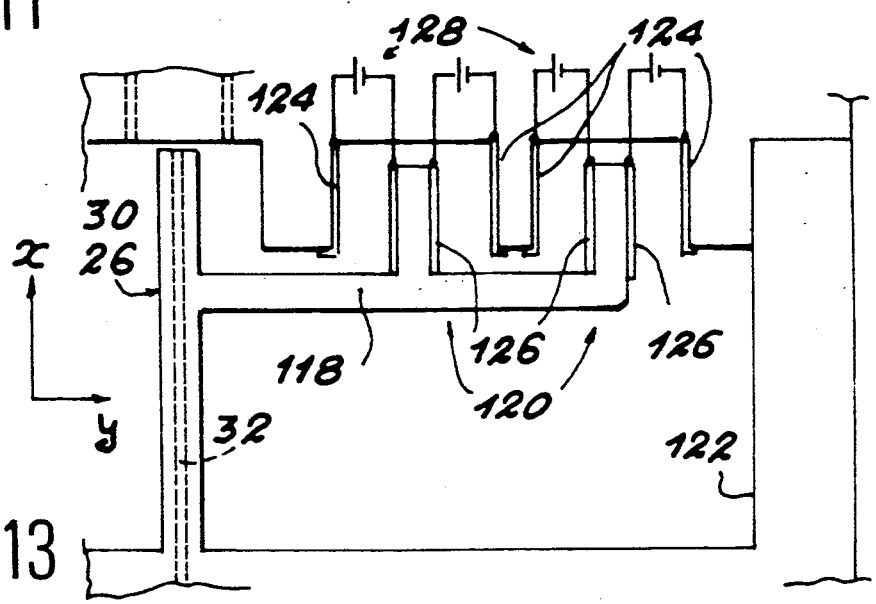

On FIG. 13, the optical switch shown comprises a main flexible girder 26 equipped with its central microguide 32 and orientated along the direction x, as well as a return movement girder 118 parallel to the direction y and integral with the main girder 26. The fixing point of the return movement girder on the main girder 26 is situated ¾ distant from the latter on the free extremity side 30.

This return movement girder 118 is further equipped with small girders 120 parallel to one another and to the direction x. This return movement girder and its small girders are defined in the guide structure 8.

The assembly 26/118/120 is intended to deform along the direction y in a suitably-shaped recess made in the silica structure and the substrate.

This embodiment is more particularly advantageous when the deformations of the girder 26 are controlled via the capacitive effect. To this effect, the recess 122 comprises notch-shaped flexures whose lateral walls, parallel to the direction x, are equipped with metallizations 124. The small girders 120 are interlaced in these notches and are equipped on their lateral faces parallel to the direction x with metallizations 126 disposed respectively opposite the metallizations 124. Each metallization pairing 124 and 126 constitutes a variable-capacity capacitor at the terminals of which it is possible to apply a potential difference by means of an electric power source 128.

This embodiment makes it possible to increase the opposing metallic surfaces and thus the capacitive force required for deformations along the direction y of the girder 26. Thus, the voltages applied may be weaker than those used previously.

Of course, other embodiments of flexible girders are possible without departing from the context of the invention.

Figure 14:
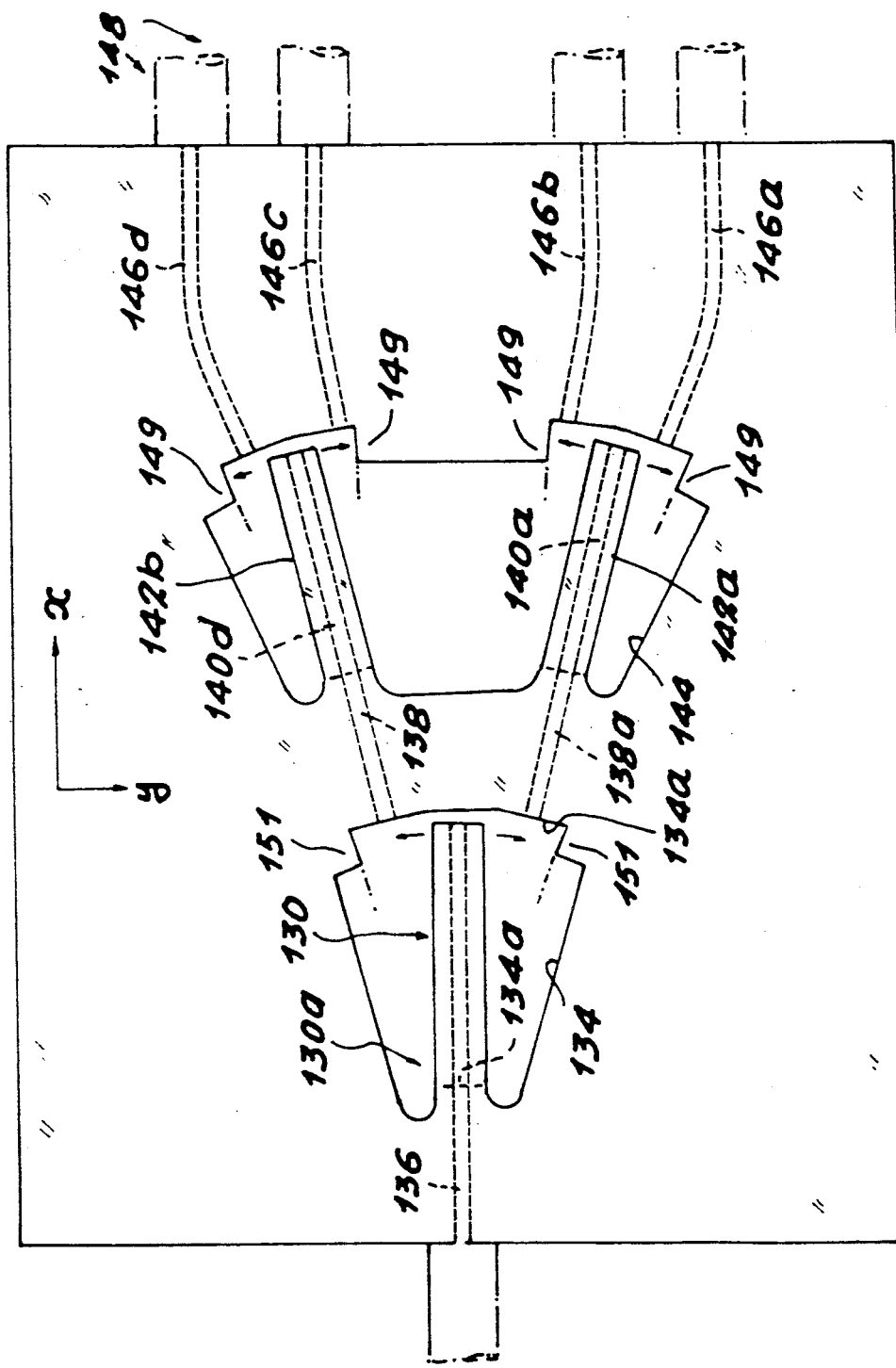

Furthermore, as shown on FIG. 14, it is possible to have several waterfall-disposed switches equipped with their girders.

On FIG. 14, one first girder 130 equipped with its microguide 132 and orientated along the direction x makes it possible, by means of deformation in the direction y in a first suitable recess 134, to ensure the switching of an incident beam conveyed by an input microguide 136 towards two output microguides 138a and 138b disposed fan-shaped (Here, the microguides 138a and 138b are linear and no longer formed of two sections forming an angle between them).

These microguides 138a and 138b are disposed in the prolongation of the central microguides 140a and 140b respectively of two flexible girders 142a and 142b able to deform along the direction y in a second recess 144 distinct from the recess 134.

These two girders 142a and 142b are disposed fan-shaped roughly along the direction x and each allow for the switching of the incident beams transported by the microguides 138a and 138b to two output microguides.

In particular, the flexible girder 142a ensures the switching of the luminous beam derived from the microguide 138a towards the two adjacent microguides 146a and 146b, and the flexible girder 142b ensures the switching of the luminous beam derived from the microguide 138b towards the adjacent output microguides 146c and 146d.

The output microguides 146a–146d are disposed fan-shaped and comprise at the output a section strictly parallel to the direction x so as to be connected to one output fiber 148 (as many output fibers as output microguides).

In this embodiment, the girders 130, 142a and 142b are girders with two positions. Stops 149 are provided on the wall 144a of the recess 144 at which the output microguides 146a–146d open out so as to limit the deformations of the girders. Similarly, stops 151 are provided on the wall 134a where the microguides 138a and 138b open out.

These stops 149 or 151 amount to two for each girder and are slightly offset with respect to the output microguides. The stops associated with each girder are disposed on both sides of the output microguide pairing associated with the girders.

The microguides 136, 138a and 138b and the girder 130 constitute a first switch and the microguides 138a–138b, 146a–146d and the girders 142a–142b constitute a second switch. These switches are embodied simultaneously.

In this embodiment, the wall 134a of the recess 134 at which the output microguides 138a–138b open into have the shape of concentric arcs of a circle centered on the fixed extremity 130a of the first girder 130.

The switching system of FIG. 14 exhibits stability and insensitivity to vibrations much better than those of switches equipped with girders having more than two (three of four, for example) positions.

Of course, when embodying the recess 144 in which the two girders 142a–142b move, the stops are embodied on the entire thickness of the guide structure. Similarly, the stops 151 are embodied at the same time as the recess 134.

In addition, it is possible to embody such stops in all the embodiment variants of a switch conforming to the invention and equipped with a two-position girder and in particular in the embodiments of FIGS. 2, 3 and 5 (See the reference 33 on FIG. 3).

TABLE I

| e ($\mu$m)   | 40   | 40   | 40   | 40  | 40  | 20  | 20  | 20  |
|---|---|---|---|---|---|---|---|---|
| V (volts)    | 10   | 30   | 50   | 80  | 100 | 10  | 30  | 50  |
| $x_c$ ($\mu$m) | 0.15 | 1.35 | 3.75 | 9.6 | 15  | 0.6 | 5.4 | 9.6 |

TABLE II

| K | 1 | 1 | 1 | 5 | 5 | 5 |
|---|---|---|---|---|---|---|
| L (mm) | 1 | 2 | 3 | 1 | 2 | 3 |
| $x_L$ ($\mu$m) | 1.4 | 11.2 | 37.8 | 7 | 56 | 189 |

What is claimed is:

1. Reversible multichannel integrated optical switch comprising a) one monocrystalline substrate, b) at least one buffer film supported by the substrate, c) at least one recess made in the substrate and the buffer film, d) at least one optical input microguide supported by the buffer film and orientated along a first direction parallel to the surface of the substrate so as to carry an incident luminous beam to be switched, e) at least two adjacent optical output microguides roughly parallel to the first direction and supported by the buffer film so as to convey the switched luminous beam, the output and input microguides being disposed on both sides of the recess and within their prolongation, f) at least one flexible girder defined in the buffer film and equipped with one central optical microguide over its entire length and orientated along the first direction, the girder comprising one fixed extremity integral with the substrate and one free extremity able to deform inside said recess along a second direction parallel to the surface of the substrate and perpendicular to the first direction, the central microguide being situated in the prolongation of the input microguide, g) excitation means to generate deformations of the girder along the second direction so as to bring the free extremity of the central microguide into the prolongation of one of the output microguides and thus switch the incident beam.

2. Optical switch according to claim 1, wherein it includes 1) at least two adjacent optical input microguides roughly parallel to the first direction, 2) at least two optical output microguides, 3) one first and one second recess, each being distinct from the other, made in the substrate and the buffer film and disposed with one being an extension of the other between the input and output microguides, 4) one first girder and one second girder integral via their fixed extremity and disposed with one being an extension of the other so that their central microguides are in coincidence and orientated along the first direction, the free extremity of the first girder being able to deform in the first recess and the free extremity of the second girder being able to deform in the second recess, 5) first means to generate deformations of the first girder so as to bring the free extremity of its central microguide into the prolongation of one of the input microguides, and 6) second means to generate deformations of the second girder so as to bring the free extremity of its central microguide into the prolongation of one of the output microguides.

3. Optical switch according to claim 1 or 2, wherein the free extremity of the girder supports a block embodied in the buffer film and able to move into said recess along the second direction, this block comprising a central microguide extending the central microguide of the girder and recesses on both sides of its central microguide.

4. Optical switch according to claim 1 or 2, wherein the girder comprises outside the central microguide at least one recess intended to lighten the girder.

5. Optical switch according to claim 4, wherein the girder comprises a recess on both sides of its central microguide.

6. Optical switch according to claim 1 or 2, wherein it includes a return movement girder defined in the buffer film orientated along the second direction.

7. Optical switch according to claim 6, wherein the return movement girder is equipped with small girders parallel to the first direction and each provided with a metallization defining, with the surfaces opposite the metallized recesses, variable-capacity capacitors.

8. Optical switch according to claim 1 or 2, wherein it includes several girders roughly parallel to the first direction and whose free extremity is able to deform inside said recess.

9. Optical switch according to claim 1 or 2, wherein at least one stop is provided in said recess close to one of the output microguides.

10. Optical switch according to claim 1 or 2 to 9, wherein the excitation means comprise at least one electrically conductive spire disposed on the surface of the girder and at its periphery, means to feed the spire with electric current and means to create a magnetic field orientated perpendicular to the surface of the girder.

11. Optical switch according to claim 1 or 2, wherein the excitation means comprise at least one variable-capacity capacitor whose armatures are parallel to the first direction, one of the armatures being mobile and integral with the girder and the other armature being fixed and integral with the recess, and means to apply a potential difference between these armatures.

12. Optical switch according to claim 3, wherein the excitation means comprise at least one electrically conductive spire disposed on the surface of the block and at its periphery, means to feed this spire with electric current, and means to create a magnetic field perpendicular to the surface of the block.

13. Optical switch according to claim 1 or 2, wherein the buffer film and the microguides are completely coated with an upper film having a refraction index smaller than that of the microguides.

14. Optical switch according to claim 13, wherein the substrate is a silicon substrate, the buffer film and the upper film are made of non-doped silica and the microguides are made of silica doped with dopers increasing its refraction index.

15. Optical switch according to claim 1 or 2, wherein the distances separating the free extremity of the girder from the input extremity of each output microguide are equal.

16. Optical switch according to claim 15, wherein these distances are less than 10 micrometers.

17. Optical switch according to claim 2, wherein the output microguides are disposed fan-shaped widening from their input towards their output and wherein the input microguides are disposed fan-shaped widening from their output towards their input.

18. Optical switch according to claim 2, wherein the minimum distance separating the input and output microguides respectively amounts to between 10 and 20 micrometers.

19. A reversible multichannel switching system with integrated optics, comprising:
several optical switches disposed waterfall-fashion;
each of said optical switches comprising a) one monocrystalline substrate, b) at least one buffer film supported by the substrate, c) at least one recess made in the substrate and the buffer film, d) at least one optical input microguide supported by the buffer film and orientated along a first direction parallel to the surface of the substrate so as to carry an incident luminous beam to be switched, e) at least two adjacent optical output microguides roughly parallel to the first direction and supported by the buffer film so as to convey the switched luminous beam, the output and input microguides being disposed on both sides of the recess and within their prolongation, f) at least one flexible girder defined in the buffer film and equipped with one central optical microguide over its entire length and orientated along the first direction, the girder comprising one fixed extremity integral with the substrate and one free extremity able to deform inside said recess along a second direction parallel to the surface of the substrate and perpendicular to the first direction, the central microguide being situated in the prolongation of the input microguide, g) excitation means to generate deformations of the girder along the second direction so as to bring the free extremity of the central microguide into the prolongation of one of the output microguides and thus switch the incident beam.

20. Method to of making an optical switch comprising the following stages:
a) formation of at least one buffer film on the substrate and equipped with one central microguide over its entire length and orientated along the first direction, and at least one output microguide roughly parallel to the central microguide and extending over only one portion of the buffer film,
b) embodiment of a mask above the buffer film defining the shapes of the recess and the girder respectively, this mask masking the major part of the central microguide,
c) etching of the buffer film as far as the substrate so as to form the girder, then
d) partial isotropic etching of the substrate so as to free the bottom of the girder and form the recess, this etching being effected for a depth exceeding $\frac{1}{2}$ where 1 represents the width of the girder measured along the second direction but smaller than the overall thickness of the substrate,
e) elimination of the mask, and
f) embodiment of the girder excitation means.

21. Method according to claim 20, wherein the buffer film is etched anisotropically.

22. Method according to claim 20 or 21, wherein the stage a) consists of depositing the buffer film on the substrate, depositing a guide film on the buffer film having a refraction index exceeding that of the buffer film and of etching the guide film over its entire thickness so as to simultaneously form the central microguide and the output microguide.

* * * * *